April 3, 1962

S. J. LAURO 3,027,761

DEVICE TO QUANTITATIVELY DETERMINE THE UNBALANCE OF A HUMAN BODY

Filed Dec. 15, 1959

INVENTOR
STEPHEN J. LAURO
BY
*James J. Cannon*
ATTORNEY

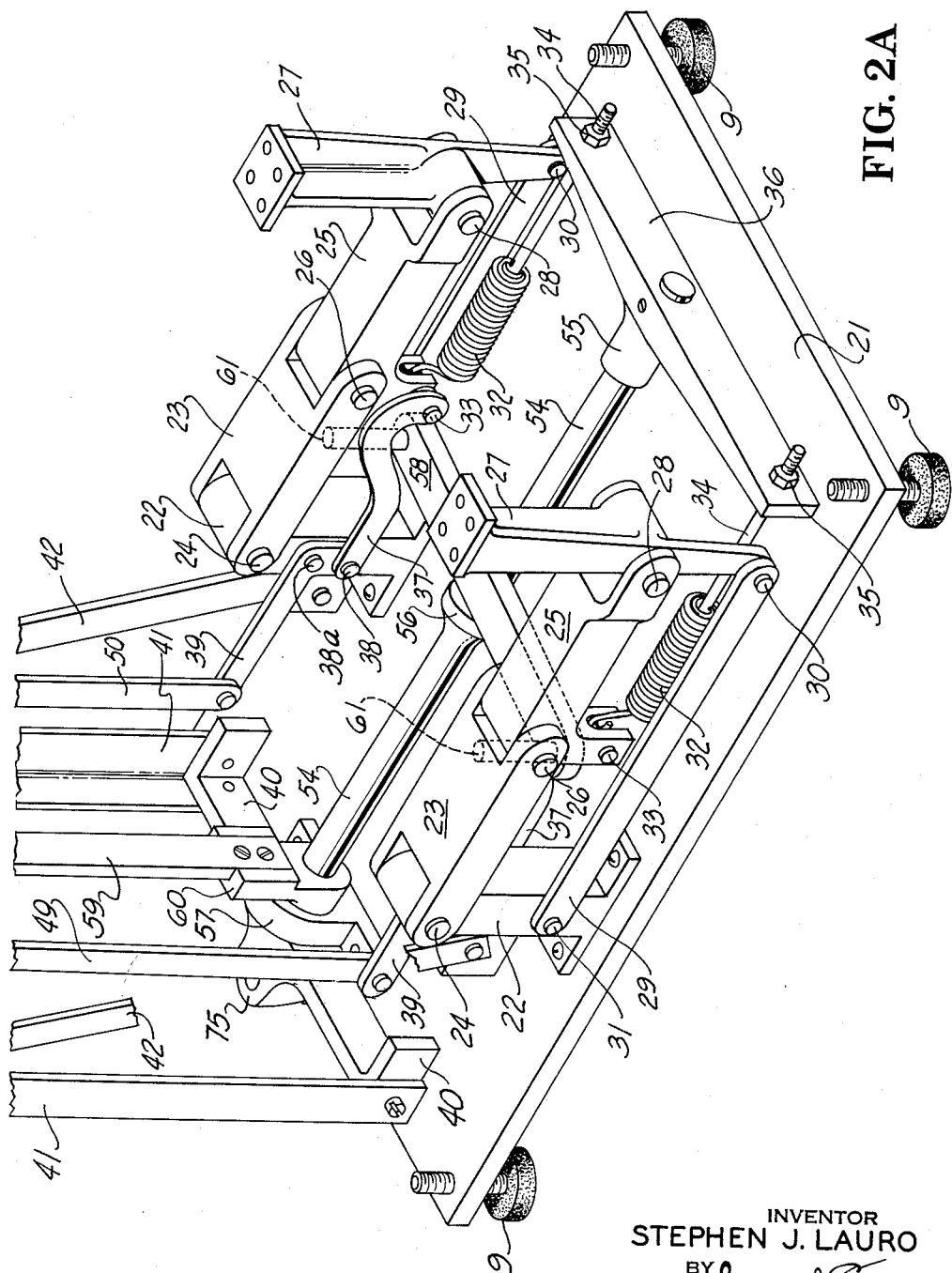

April 3, 1962   S. J. LAURO   3,027,761
DEVICE TO QUANTITATIVELY DETERMINE THE
UNBALANCE OF A HUMAN BODY
Filed Dec. 15, 1959   4 Sheets-Sheet 3

INVENTOR
STEPHEN J. LAURO
BY
James J. Cannon
ATTORNEY

April 3, 1962 S. J. LAURO 3,027,761
DEVICE TO QUANTITATIVELY DETERMINE THE
UNBALANCE OF A HUMAN BODY
Filed Dec. 15, 1959 4 Sheets-Sheet 4
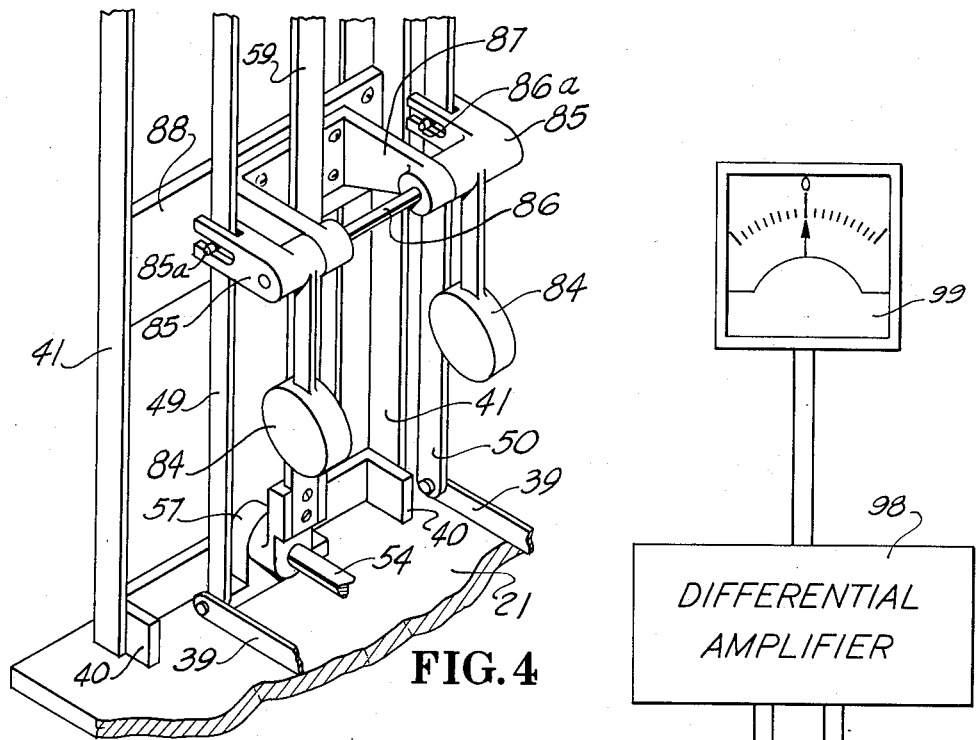
FIG. 4
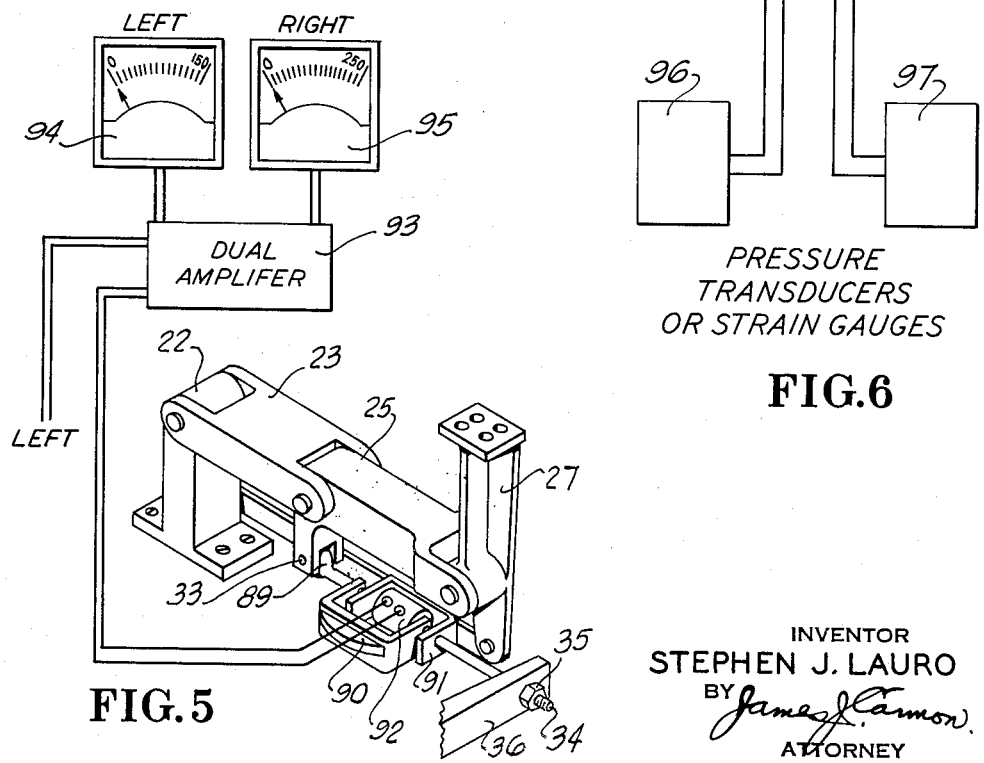
FIG. 5
FIG. 6
INVENTOR
STEPHEN J. LAURO
BY James J. Cannon
ATTORNEY

United States Patent Office 3,027,761
Patented Apr. 3, 1962

3,027,761
DEVICE TO QUANTITATIVELY DETERMINE THE UNBALANCE OF A HUMAN BODY
Stephen J. Lauro, 443 12th Ave., Paterson, N.J.
Filed Dec. 15, 1959, Ser. No. 859,768
10 Claims. (Cl. 73—172)

This invention relates to devices for the purpose of determining the transverse center of gravity of the human body when standing erect, and to quantitatively indicate the degree of weight unbalance, so that appropriate manipulations or lift may be applied to correct the posture.

The purpose of this invention is to measure the difference in height of weighing balance platforms upon which the patient stands when a plumb line close to the back of the patient is in the center of the occupt and the center of the sacrum, and when both weighing scales show an even reading or zero difference. When this balance is established, the scale indicates in inches, or fractional inches the deficiency in height of one side or the other side of the body.

However, this difference in height of one side of the body or the other is due to an improper compensation of the congenital or traumatic structural anomaly in the body, or non-reducible subluxiations of the skeletal frame. When there is difference in weight on one side or the other the body is not in balance; therefore, the device will indicate the exact lift necessary to balance the weight equally on both sides in relation to the center of gravity.

Another object of the invention is to provide an instrument for periodic scientific measurement of postural unbalance in order to determine the effectiveness of the treatments, and/or to show progress in the improvement and correction of body posture.

Other objects, features and advantages of the invention will be apparent from the following description when read with reference to the accompanying drawings wherein:

FIG. 4 is another modification of the invention differing from FIG. 2 in that the balance springs are substituted for by balance pendulums.

FIG. 5 is another modification of the invention, differing from FIG. 2 in that the springs are substituted for by electrical pressure transducers, and the scale drums are substituted for by electrical indicators.

FIG. 6 is another modification of the invention differing from FIG. 5 in that, instead of two independent meters, only one differential meter is used.

Figure 1:
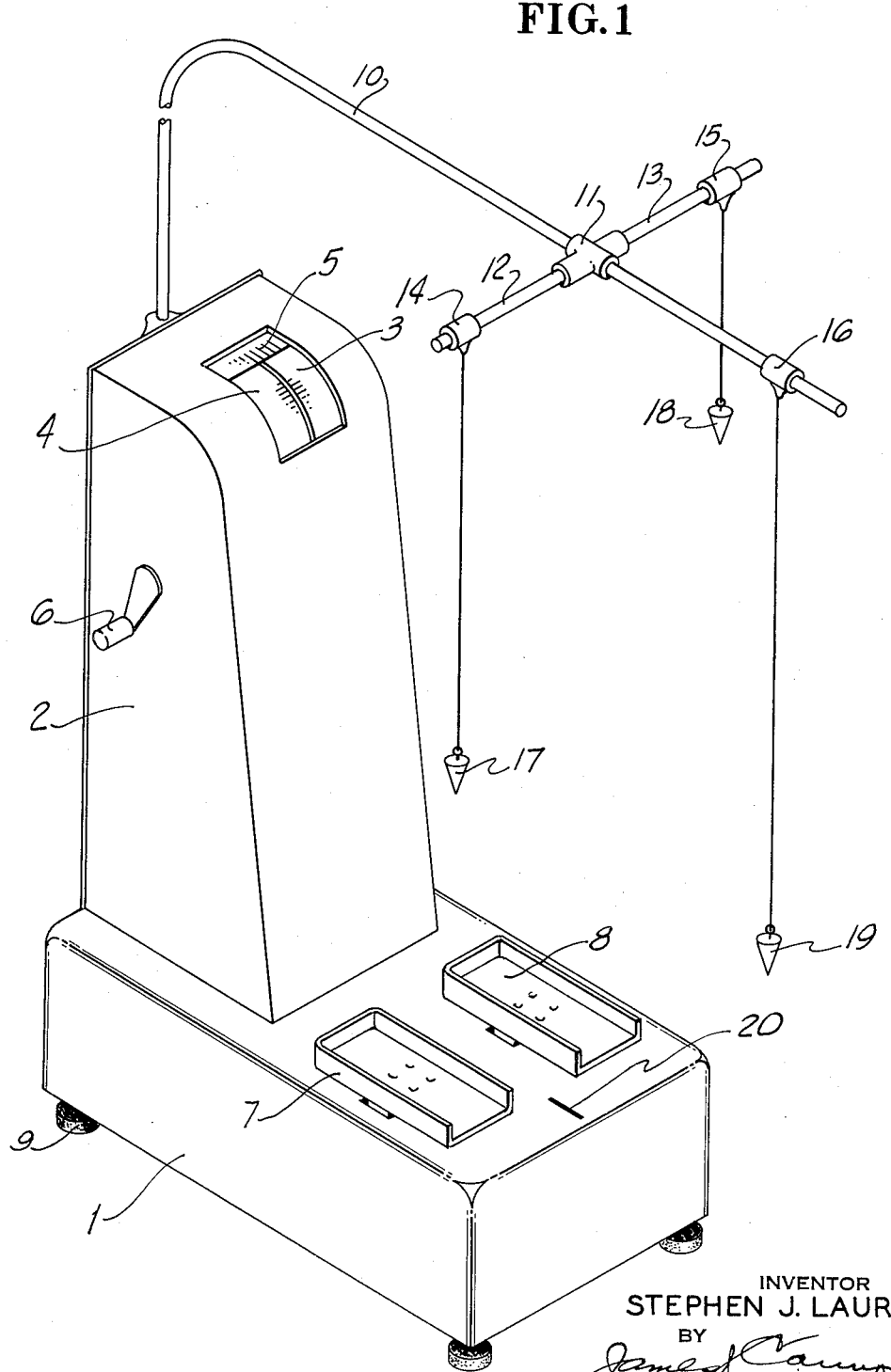
FIG. 1 is a perspective view of the device in its preferred form.

Referring now in detail to FIG. 1, 1 is the cover over the weighing and lifting mechanism, 2 covers the scale movement and lift control mechanism, 3 is the weight indicating drum for the right side, 4 is the same for the left side, and 5 is a scale tape indicating the difference in heights. Crank 6 is provided for varying the relative height of the foot platforms 7 and 8, and also moves the scale tape 5 in direct proportion. Heels 9 are adjustable to level the device. Abbreviated bent tube 10 slidably receives cross fitting 11 to which are fastened cross extension tubes 12—13, and each of said cross extension tubes slidably receives plumb line slides 14—15 and movably fitted on the front end of tube 10 is a slide 16.

Fastened to each of the slides 14, 15 and 16 is an extensible plumb line, the method of extending or shortening not shown, having plumb bobs 17, 18 and 19 respectively. The purpose of the plumb bobs 17 and 18 are to align the body of the patient, and bob 19 is set to the height of the occupt to align the spine of the patient.

When the patient stands on the scale, he faces the dials, and according to age and/or size his feet are against either the inside or the outside rims of the platforms 7 and 8, and his toes in all cases against the foreward rim. However, it should be noted on the patient's history card against which side he was standing to obtain consistent repeat readings. Mark 20 on cover 1 is for the purpose of checking the correct position of tube 10 when bob 19 is dropped to meet mark 20.

Figure 2B:
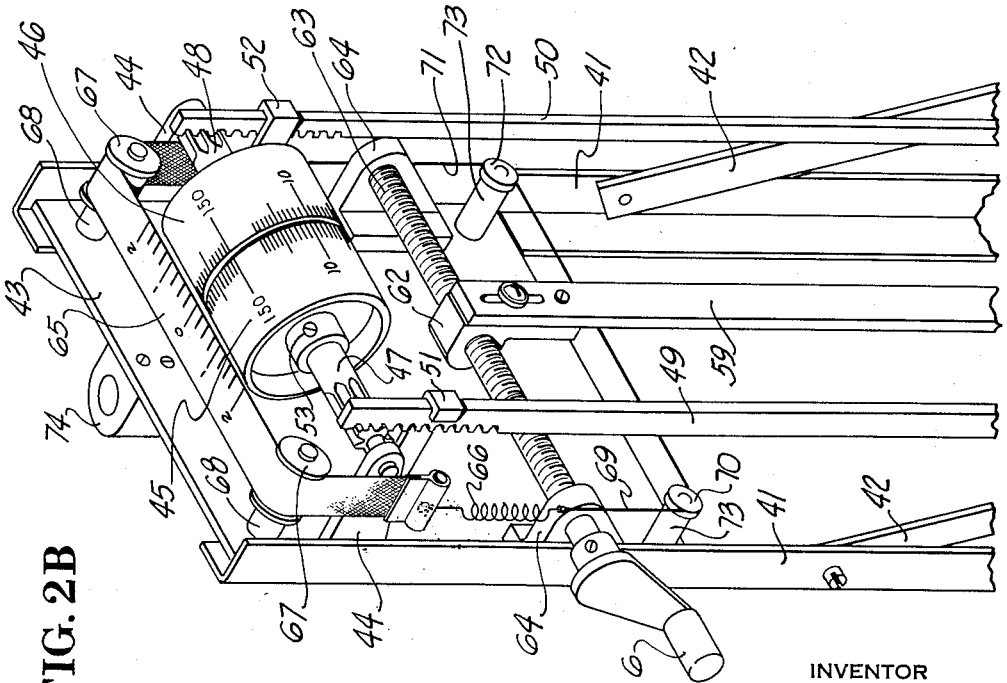
FIG. 2 is the same with the covers, the plumb line carrying bracket, and the foot platforms removed.

Referring to FIG. 2, it may be remarked here that accuracy in performance is a necessity and a number of articulated joints should hinge on ball or roller bearings. In order to avoid confusion and to simplify the drawings however, only hinge pins are indicated in outlining the general principle involved, and no claims are made to the exact mechanical joint construction.

In FIG. 2, 21 is a base plate having tapped holes in each corner to adjustably receive heels 9 for leveling the apparatus. Fastened to base 21 are brackets 22—22, each hingably receiving a double-forked link 23—23 pivoting on pins 24—24. Pivotally mounted to the other end of each link 23 is a forked bell-crank lever 25—25, pivoting on pins 26—26, and in the fork of each bellcrank lever pivotally mounted are foot platform bars 27—27 pivoting on pins 28—28. The lower extension of bars 27—27 pivotally receive bars 29—29 forming substantially a parallelogram by being pivoted to bases 22—22 by pins 30—30 and 31—31 respectively.

The downward extension of bellcrank levers 25—25 is slit to receive weigh springs 32—32 hooked on cross pins 33—33. The other end of each spring is curled around bolts 34—34 and adjustably fastened by nuts 35—35 to rocker arm 36.

The downwardly-extending arms of bellcrank levers 25 have a hub projection facing each other, and pins 33 extend beyond these hubs to pivotally receive links 37—37. The other end of links 37—37 are pivotally connected by pins 38—38 to the downward extending arm of bellcrank levers 39—39. Pivotally mounted to brackets 22—22 by pins 38a—38a the center distances of links 23—23 and 37—37 are equal, also the mean vertical distance of pivotal centers are equal, forming a parallelogram, so that any angular motion imparted to links 23—23 will not alter the angular position of bellcrank levers 39—39.

Forming part with base plate 21 is angle rib 40 to which are fastened vertically extending structural angle members 41—41, held rigid by braces 42—42. Further rigidity is imparted to the structure by bracket mounting plate 43. Mounted upon this plate are bearing brackets 44—44, and a third one not shown between scale drums 45—46 so that each drum can independently rotate on their respective shafts 47 and 48. Forming part of each shaft is a pinion engaging their respective actuating rack bars 49 and 50. Proper engagement of the racks and pinions is assured by guide brackets 51 and 52 fastened to mounting plate 43. The lower end of rack bars 49 and 50 are pivotally linked to bellcrank levers 39—39 so that any angular motion taking place on the bellcrank levers is converted to rotary motion of the scale drums.

When weight is applied to either one or both foot platforms 7 and 8, the vertical movement thereof imparts a substantially horizontal motion of the lower bellcrank arm, thereby stretching the springs 32—32 in proportion to the applied weight, which motion is transmitted by links 37—37 to the short arm of bellcrank levers 39—39, and converted to an amplified vertical motion applied to rack bars 49 and 50, so that each scale drum assumes an angular position indicative of the respectively applied weight.

As mentioned above, springs 32—32 are adjustable by nuts and lock nuts 35—35, and when rocker arm 36 is in horizontal position the springs are adjusted to obtain equal height of the top face of vertical bars 27—27, and the scale drums are set to zero by set screw 53 on the hub of each scale drum.

Rocker arm 36 is rigidly pinned to horizontal bar 54, bearing mounted in brackets 55—56 and 57 fastened to base plate 21. Another rocker arm 58 is also pinned fast to shaft 54 so that both rocker arms move in unison when angular motion is applied to upwardly extending control bar 59 fixed to shaft 54 through bracket 60, also pinned to the shaft 54. Each end of rocker arm 58 is provided with a ball socket depression to receive double ball pointed push rod 61—61, the upper end of which engages a corresponding ball socket in links 23—23. The center distance between the ball sockets in rocker arm 58 is less than the center distance of the spring bolts 34—34 to compensate for the leverage gain obtained by the distance ratio of pivot pin 24 to the ball socket in link 23, and pivot pin 24 to pivot pin 26 so that both anchor points of springs 32 move exactly the same amount, for any relative angular displacement of the springs would cause a false weight reading. The ball sockets in links 23—23 are correspondingly off-set to substantially vertically receive push rods 61—61.

Slidably pivoted to the upper end of control arm 60 is a nut 62 which receives control screw 63. Each end of screw 63 is rotatably mounted in brackets 64—64 fastened to mounting plate 43. Fastened to one end of screw 63 is the crank 6. Turning screw 63 imparts angular movement to control arm 59 thereby causing opposing vertical height displacement of bellcrank levers 25—25 together with the foot platforms, the amount of displacement being indicated by height scale band 65 calibrated to corresponding inches, or millimeters, or both. This scale reading indicates the difference of the foot platform heights when there is no difference in weight, that is, when the body is in balance.

Scale hand 65, kept taut by spring 66 fastened to one end thereof, rides around flanged rollers 67—67 rotating on studs 68—68 fastened to mounting plate 43. The end of spring 66 is fasented to one end of a flexible cord or cable 69 making a 90° turn around grooved pulley 70, the other end of said cord being fastened to control arm 59. The other end of band 65 is tied to one end of a cord 71 riding around grooved pulley 72, and the other end of said cord being adjustably fastened to control arm 59. When cord 71 is fastened, spring 66 is stretched to obtain zero reading on band 65 when control arm is perfectly perpendicular, or, when both foot platforms are of equal height. Grooved pulleys 70 and 72 are rotatably mounted on studs 73—73 fastened to mounting plate 43. Also fastened to plate 43 is a bracket 74 to receive the tube 10, the lower end of which fits into rocket 75 forming part of the base plate 21.

Figure 3:
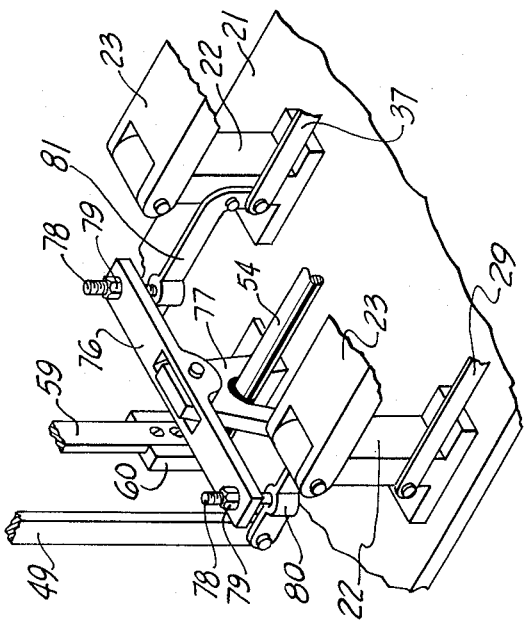
FIG. 3 shows a modified form in which all the essential parts are the same as in FIG. 2 except, instead of using two independent scale drums, only one is used with a differential lever arrangement.

FIG. 3 shows a modification of the weighing system in which the difference in weight is indicated on a single scale drum. As pointed out above, it is of no great importance to know how many pounds a person is unbalanced, as that may vary from person to person under identical types and degrees of body posture deformity. It is important however to be able to determine a perfect balance by raising one or the other foot a known amount, which occurs when there is zero difference in weight and the tape reading shows the difference. This is accomplished by using a differential rocker arm 76 pivotally mounted on bracket 77 fastened to base plate 21. Each end of rocker arm 76 is provided with adjusting screws 78—78 with lock nut 79—79. The lower end of each screw 78—78 is ball pointed and slidably rests on the enlarged area portion of bellcrank levers 80 and 81 respectively, linked to the brackets 22—22. Bellcrank lever 80 is extended to pivotally receive rack bar 49, the vertical movement of which in either direction from neutral will cause corresponding rotation of scale drum 82 indicating which side is heavier. Screws 77—77 are adjusted to horizontal position of differential arms 76 without stressing springs 32—32 (FIG. 2), and scale drum 82 is set at zero by set screw 83. All other functional elements are the same as shown in FIG. 2.

FIG. 4 shows another modification of the invention herein. Pendulum weights 84—84 are substituted for springs 32—32, FIG. 2, forming part of bellcrank levers 85—85 and are pivotally suspended on rod 86 journalled in U-bracket 87 fastened to cross mounting plate 88 which in turn is fastened to upright structural angles 41—41. Bellcrank levers 85—85 straddle rack bars 49 and 50 respectively and are constrained by pins 85a—86a penetrating and fixed on rack bars 49 and 50 so that upward vertical movement of rack bars 49 or 50 or both, will cause weights 84—84 to swing in proportion to the weight applied to the foot platforms. As the springs are omitted rocker arm 36, bracket 55, bolts 34 and lock nuts 35 (FIG. 2) are not used. Also, shaft 54 shortened, and ends in rocker arm 58. Otherwise all other structural elements are the same as the embodiment shown in FIG. 2.

When the patient first steps on the scale with both feet on the respective platforms, being out of postural balance the spring on the heavier side will yield more than that of the lighter side, so that the difference in heights is not a true indication of the actual body disfigurement until the platform heights are adjusted to a perfect balance. For those technicians who would object to this discrepancy before zero setting of the balance, a device as shown in FIG. 5 may be employed. In this arrangement an electrical pressure transducer of suitable characteristics is used in place of the springs 32—32, possibly a strain gauge type, subject to compression according to the weight applied. It can also be a tension type electrical transducer. In either case, the amount of physical displacement is so minute that conventional methods of scale measurements are inadequate and it is necessary to use a suitable electronic amplifier to energize a meter calibrated to represent units of pressure, or tension, applied. Referring to FIG. 5, eyebolt 89 pivots on pin 33 and forms part of yoke 90, and bolt 34 forms part of yoke 91. The far inside faces of each yoke embraces transducer 92 so that application of weight on the corresponding foot platform causes a corresponding compression upon the transducer 92, the electrical output of which is amplified by one section of amplifier 93 to energize the respective visual indicator 94 or 95.

FIG. 6 is another modification of the invention differing from that of FIG. 5 in that transducers 96 and 97 are connected to a common differential amplifier 98 the output of which is connected to an electrical indicator 99 which will read zero when both transducers are under equal stress.

While I have illustrated and described herein several forms in which my invention can conveniently be embodied in practice, it is obvious that the invention is not to be considered limited to the exact forms disclosed, but that changes may be made therein, within the scope of what is claimed, without departing from the spirit of the invention.

Having thus disclosed and set forth the invention, what I claim is:

1. In a posture analyzing apparatus, the combination comprising, a pair of vertically depressible side-by-side platforms for receiving the feet of a person to be analyzed in erect standing position, means connected with each of said platforms for indicating the proportion of total body weight resting on each platform, and means for independently controlling and measuring the relative height of said platforms to equalize the person's weight thereon to determine the lift required at one foot or the other to balance the weight of the body equally on both sides.

2. A posture analyzing apparatus, as defined in claim 1, including a plumb line extending down from above the person and to the rear for anterior-posterior visual postural evaluation, and a pair of plumb lines extending down from above the person and at each side for lateral visual postural evaluation.

3. The invention as defined in claim 1, wherein said weight indicating means comprises spring scales each having a helical spring and including a rotary weight indicator dial.

4. The invention as defined in claim 1, wherein said means for independently controlling and measuring the relative height of said platforms includes a movable indicating strip calibrated in linear unit of measurement for directly indicating the lift required at one platform foot or the other.

5. The invention as defined in claim 1, wherein said weight-indicating means comprise pendulum scale mechanisms.

6. The invention as defined in claim 1, wherein said weight-indicating means comprise pressure sensitive electrical transducers.

7. The invention as defined in claim 6, wherein each of said transducers is connected through an electrical amplifier to an electrical meter.

8. The invention as defined in claim 6, wherein said transducers are connected through a differential amplifier to a two pole meter.

9. In a posture analyzing apparatus, the combination comprising, a support structure, a pair of side-by-side platforms mounted for vertical depression with respect to said support structure for receiving the feet of a person to be analyzed in erect standing position, means interconnecting said platforms indicating the weight differential on the platform supporting the greatest weight, and means for independently controlling and measuring the relative height of said platforms to equalize the person's weight thereon to determine the lift required at the proper foot to balance the weight of the body equally on both sides.

10. A posture analyzing apparatus as defined in claim 9, including a plumb line extending down from above the person and to the rear for anterior-posterior visual postural evaluation, and a pair of plumb lines extending down from above the person and at each side for lateral visual postural evaluation.

References Cited in the file of this patent

UNITED STATES PATENTS

| 2,374,105 | Kraus | Apr. 17, 1945 |
| 2,487,956 | Toftness | Nov. 15, 1949 |
| 2,653,475 | Kraus | Sept. 29, 1953 |

FOREIGN PATENTS

| 37,860 | Germany | June 13, 1886 |